Patented Nov. 13, 1945

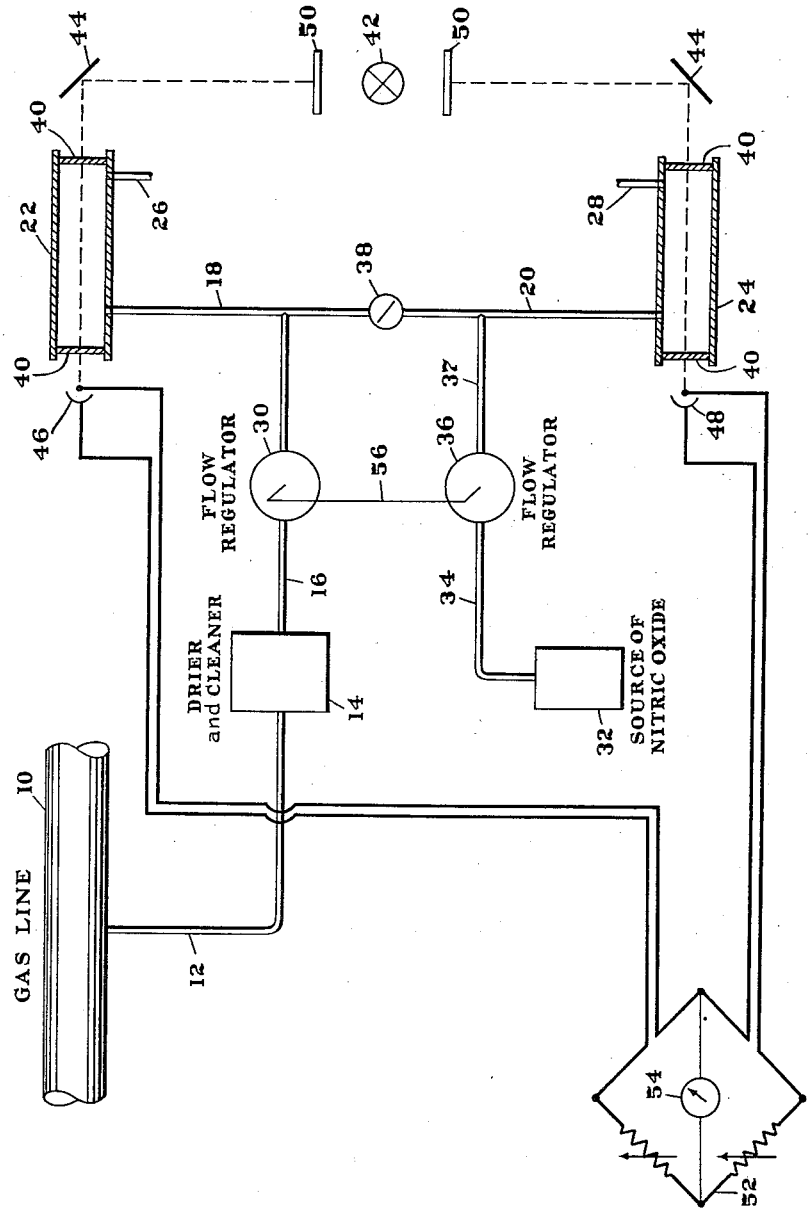

2,389,046

UNITED STATES PATENT OFFICE 2,389,046

METHOD OF ANALYZING GASES

Donald G. C. Hare, Houston, Tex., assignor, by mesne assignments, to The Texas Company, New York, N. Y., a corporation of Delaware Application September 4, 1941, Serial No. 409,480

1 Claim. (Cl. 23—232)

This invention relates to a method of analyzing gases and more particularly to a method of determining and controlling the oxygen content of a mixed gas. The principal object of the invention is to provide a method and an apparatus by means of which the amount of oxygen in a gas passing through a conduit to a point of use can be accurately determined and controlled.

This method can advantageously be used in connection with the reactivation of catalysts employed in the catalytic treatment of hydrocarbons. For example, in the catalytic cracking of oil the hydrocarbons are passed through beds of catalysts which become coated with carbonaceous material or coke as a result of the cracking operation. It is customary to carry out such processes in cycles by discontinuing the flow of hydrocarbons when the catalyst loses activity and then regenerating the catalyst by burning off the deposited coke by means of hot oxygen containing gas. Ordinarily the reactivating gas may conveniently be flue gas containing a small, controlled percentage of oxygen whereby the coke deposited on the catalyst can be burned off without raising the temperature of the catalyst to a sufficiently high degree to injure the catalyst. After regeneration the flow of hydrocarbons to the catalyst is resumed.

Most of the methods now in use require a considerable time to make a determination of oxygen content of the desired accuracy. For instance, the temperature rise in the catalyst chambers may be used as an indirect measure of the amount of oxygen present in the reactivating gases but this is not particularly satisfactory either from the standpoint of safety or control of the burning operation. In accordance with the present invention, a substantially instantaneous determination of the oxygen content of the catalytic gases can be made and a better control can thereby be effected. It has been found that with this method the time lag, that is, the time necessary to obtain a determination may be of the order of from 5 to 10 seconds or even less.

In carrying out the invention a portion or sample of the gas to be analyzed is bled into two cells or chambers fitted with glass windows through which beams of light are caused to pass to light-sensitive cells, these cells being connected preferably in a bridge circuit in a manner such that the difference in light intensity falling on the cells can be measured. A substance such as nitric oxide capable of combining with the oxygen to darken the gas is added to the gas sample in one of the chambers, and the intensity of the light passing through this chamber will then be less than that passing through the other chamber, and the difference in intensity which is a function of the oxygen present can be determined by a suitable meter in the bridge circuit. When the colorless gas, nitric oxide, is mixed with oxygen a rapid reaction takes place even when the gases are dry and cold, with the result that the nitric oxide is oxidized to an oxidation product comprising at least a substantial proportion of an oxide of nitrogen and containing nitrogen and oxygen in the atomic ratio of 1:2; i. e., nitrogen dioxide or nitrogen tetraoxide. The oxidation product is nitrogen tetraoxide, a gas having a dark red-brown color at ordinary temperatures. The fact that this gas is colored, of course, means that light passing through the gas is selectively absorbed and transmitted. If sufficient nitric oxide is admitted to allow reaction with all of the oxygen present in a mixture of gases, the amount of oxidation product formed and hence, the color of the resulting gas will be proportional to the amount of oxygen originally present and the color of this gas and thus, the oxygen content can be measured as has been described.

For a better understanding of the invention reference may be had to the accompanying drawing in which the single figure is a diagrammatic representation of an apparatus adapted to carry out the method.

Referring to the drawing, a continuous sample of the gas to be analyzed is bled from a gas line 10 through a pipe 12 and preferably passed through a drying and cleaning device 14. The dry, clean gas then flows through pipe 16 and branch pipes 18 and 20 to a pair of cells or chambers 22 and 24, leaving these chambers through pipes 26 and 28. A flow regulator 30 in the line 16 serves to control the amount of dry gas passing to the cells and the branch pipes 18 and 20 are preferably of such capillary size that the same amounts of gas will pass into the chambers 22 and 24. Nitric oxide from a source 32 passes through pipe 34 and a flow regulator 36 and then through a capillary size pipe 37 to the branch pipe 20 where it is mixed with a portion of the gas sample. A check valve 38 prevents the nitric oxide from passing into the cell 22.

Each of the cells 22 and 24 is provided with glass windows 40 and light from a source 42 is directed by means of mirrors 44 through the cells to a pair of light sensitive devices, such as the photoelectric cells 46 and 48. Filters 50 may be inserted in the path of the light in order to limit the light passing through the cells to any desired portion of the light spectrum. The photoelectric cells 46 and 48 are connected in legs of the Wheatstone bridge circuit 52, which contains a suitable galvanometer 54. The flow regulator 36 may be connected to the flow regulator 30, as indicated at 56 so that the nitric oxide passing into the gas in cell 24 will be in a predetermined proportion to the amount of gas passing through the pipe 16.

In operation, as explained hereinbefore, the nitric oxide has the property of combining with oxygen to form the dark reddish-brown gas, the oxidation product, and this latter gas will strongly absorb certain portions of the light spectrum and thus, when introduced into the cell 24 will reduce the amount of light passing to the photoelectric cell 48 in proportion to the amount of oxidation product present. Since the cell 22 contains at all times an equal amount of the original gas as the cell 24, any coloration or impurity which will affect the light intensity will affect both photoelectric cells 46 and 48 equally. However, the light falling on the photoelectric cell 48 is, as has been explained, dependent upon the amount of oxidation product and hence, of oxygen present in the gas in the cell 24 and, since the two photoelectric cells are connected in the bridge circuit 52, the reading of the meter 54 will depend upon the difference in light intensity falling on the two photoelectric cells and this difference in intensity is a function of the amount of oxygen present in the gas sample.

Since the two photoelectric cells are illuminated by the same light source 42, any variation in this light source will affect both photoelectric cells equally and thus, to a high approximation, the reading of the meter 54 will not be affected by any such variation in the light source. Furthermore, as has already been explained, since both cells 22 and 24 contain equal amounts of the original gas sample, any discoloration or opacity of this gas will affect the amount of light falling on each cell equally and, therefore, will not affect the reading of the meter.

If it is desired to make a continuous record of the oxygen content of the gas flowing through pipe 10, the meter 54 may, of course, be replaced by any suitable recording device, not shown. Again, it is believed obvious that the meter 54 can be replaced by any suitable control mechanism which may, for instance, be used to regulate the amount of oxygen injected into the gas so that the oxygen content of the mixed gases may be maintained within any desired limits.

Obviously many modifications and variations of the invention, as hereinbefore set forth, may be made without departing from the spirit and scope thereof and, therefore, only such limitations should be imposed as are indicated in the appended claim.

I claim:

The method of determining the oxygen content of a gas used in the reactivation of a catalyst which comprises drying and cleaning a continuously flowing sample stream of said gas, dividing the stream of dried and cleaned gas into two portions, conducting one of said portions through a first transparent chamber and the other portion through a second transparent chamber, adding to said other portion after division and before its passage through the second chamber a quantity of nitric oxide in amount capable of combining with all of the oxygen which might be in said other portion to form an oxide of nitrogen darker than the original gas, controlling the amount of nitric oxide added to said other portion in accordance with the rate of flow of the dried and cleaned gas before division so as to maintain a predetermined ratio between the volumes of nitric oxide added and gas before division, passing an equal amount of light radiation through said chambers and measuring the difference in the amount of light absorbed in said chambers.

DONALD G. C. HARE.